US012569867B2

(12) United States Patent
Ma et al.

(10) Patent No.: US 12,569,867 B2
(45) Date of Patent: Mar. 10, 2026

(54) APPARATUS FOR USE WITH MULTIPLE COUPLEABLE ACCESSORIES

(71) Applicant: THE CLOROX COMPANY, Oakland, CA (US)

(72) Inventors: Benjamin Ma, Pleasanton, CA (US); Jacob McMullen, Newark, CA (US)

(73) Assignee: THE CLOROX COMPANY, Oakland, CA (US)

( * ) Notice: Subject to any disclaimer, the term of this patent is extended or adjusted under 35 U.S.C. 154(b) by 251 days.

(21) Appl. No.: 18/481,317

(22) Filed: Oct. 5, 2023

(65) Prior Publication Data

US 2024/0149284 A1 May 9, 2024

Related U.S. Application Data

(60) Provisional application No. 63/422,413, filed on Nov. 3, 2022.

(51) Int. Cl.
*B05B 11/00* (2023.01)

(52) U.S. Cl.
CPC ........ *B05B 11/0008* (2013.01); *B05B 11/001* (2013.01)

(58) Field of Classification Search
CPC .......................... B05B 11/0008; B05B 11/001
See application file for complete search history.

(56) References Cited

U.S. PATENT DOCUMENTS

| | | | |
|---|---|---|---|
| 4,346,821 | A | 8/1982 | Wesner et al. |
| 5,725,132 | A | 3/1998 | Foster et al. |
| 5,806,724 | A | 9/1998 | Foster |
| 5,810,209 | A | 9/1998 | Foster |
| 5,845,820 | A | 12/1998 | Foster |
| 5,928,594 | A | 7/1999 | Foster |
| 6,006,930 | A | 12/1999 | Dreyer et al. |
| 6,032,814 | A | 3/2000 | Foster |

(Continued)

FOREIGN PATENT DOCUMENTS

| | | |
|---|---|---|
| DE | 202014102561 U1 | 8/2014 |
| EP | 0932580 | 8/1999 |

(Continued)

OTHER PUBLICATIONS

Notification of Transmittal of International Search Report and Written Opinion including International Search Report and Written Opinion for International Application No. PCT/US2023/076190 dated Feb. 12, 2024, 14 pages.

(Continued)

*Primary Examiner* — Jennifer C Chiang
(74) *Attorney, Agent, or Firm* — Edell, Shapiro & Finnan, LLC

(57) ABSTRACT

An apparatus to which multiple dispensing accessories having different connections can be coupled. The different connections enable a variety of dispensing or spraying mechanisms to be coupled. Also, an apparatus that can be coupled to both a concentrate delivering accessory and to a fluid dispensing accessory. Such an apparatus allows a user to provide a concentrate to a fluid in a container or bottle via a first or concentrate delivering accessory, and then utilize a second accessory, such as a dispensing or spray head, to dispense the mixture of the fluid and concentrate from the bottle.

20 Claims, 11 Drawing Sheets

(56) References Cited

U.S. PATENT DOCUMENTS

| | | | |
|---|---|---|---|
| 6,126,090 | A | 10/2000 | Wadsworth et al. |
| 7,178,702 | B2 | 2/2007 | Maas et al. |
| 7,478,739 | B2 | 1/2009 | Foster |
| 8,297,479 | B2 | 10/2012 | Hoefing et al. |
| 8,408,429 | B2 | 4/2013 | Dennis |
| 8,408,430 | B2 | 4/2013 | Dennis |
| 8,453,950 | B2 | 6/2013 | Dennis |
| 8,608,033 | B2 | 12/2013 | Hoefing et al. |
| 8,627,985 | B2 | 1/2014 | Dennis |
| 8,800,822 | B2 | 8/2014 | Good et al. |
| 8,839,992 | B2 | 9/2014 | Dennis |
| 8,870,033 | B2 | 10/2014 | Alluigi et al. |
| 8,881,953 | B2 | 11/2014 | Dennis |
| 9,751,667 | B2 | 9/2017 | Guery et al. |
| 9,776,772 | B2 | 10/2017 | Tada et al. |
| 9,827,581 | B2 | 11/2017 | Good et al. |
| 9,878,834 | B2 | 1/2018 | Azelton et al. |
| 10,046,347 | B2 | 8/2018 | Alluigi |
| 11,014,107 | B2 | 5/2021 | Alluigi |
| 11,198,546 | B2 | 12/2021 | Guery et al. |
| 2008/0149587 | A1 | 6/2008 | Sweeton et al. |
| 2008/0257913 | A1 | 10/2008 | Contiero |
| 2009/0152270 | A1 | 6/2009 | Crowe et al. |
| 2010/0018999 | A1 | 1/2010 | Maas et al. |
| 2011/0024465 | A1 | 2/2011 | Roosel et al. |
| 2011/0036927 | A1 | 2/2011 | Hensen |
| 2013/0118641 | A1 | 5/2013 | Beranger |
| 2020/0246817 | A1 | 8/2020 | Maas et al. |
| 2023/0149960 | A1 | 5/2023 | Beranger et al. |
| 2024/0269699 | A1* | 8/2024 | Alluigi ................ B05B 11/1067 |

FOREIGN PATENT DOCUMENTS

| | | | |
|---|---|---|---|
| EP | 1020232 | A2 | 7/2000 |
| EP | 1345702 | | 9/2003 |
| EP | 1007471 | | 6/2006 |
| EP | 2001792 | A2 | 12/2008 |
| EP | 2125244 | | 12/2009 |
| EP | 2600984 | | 6/2013 |
| EP | 2611707 | | 7/2013 |
| EP | 2708472 | A1 | 3/2014 |
| EP | 3223959 | | 10/2017 |
| WO | 2016/009192 | A1 | 1/2016 |
| WO | 2019068774 | A1 | 4/2019 |
| WO | 2019092517 | A1 | 5/2019 |

OTHER PUBLICATIONS

Originally filed specification and drawings for pending U.S. Appl. No. 18/609,644, filed Mar. 19, 2024, entitled "Apparatus for Use With Multiple Coupleable Accessories", 42 pages.

* cited by examiner

APPARATUS FOR USE WITH MULTIPLE COUPLEABLE ACCESSORIES

RELATED APPLICATION

This application claims priority to and the benefit of U.S. Patent Application Ser. No. 63/422,413, filed Nov. 3, 2022, entitled "Apparatus for Use with Multiple Coupleable Accessories," the disclosure of which is incorporated by reference herein in its entirety for all purposes.

FIELD OF THE INVENTION

The present invention is directed generally to an apparatus from which a fluid is dispenses, and more specifically, to an apparatus for dispensing fluid and to which multiple accessories can be coupled.

BACKGROUND

Devices for receiving and containing a fluid therein are well known. Typically, such a device is a container, such as a bottle, that has an internal chamber in which a fluid can be located. A dispensing accessory, such as a spray head, is removably coupled to the bottle so that a user can dispense the fluid from the bottle. One manner of dispensing is to spray the fluid from the bottle. Conventional containers or bottles have a single mounting structure that facilitates one type or size of dispensing accessory to be coupled to the bottle.

There is a need for an apparatus to which multiple dispensing accessories having different connections can be coupled. The different connections enable a variety of dispensing or spraying mechanisms to be coupled. There is also a need for an apparatus that can be coupled to both a concentrate delivering accessory and to a fluid dispensing accessory. Such an apparatus would allow a user to provide a concentrate to a fluid in a container or bottle via a first or concentrate delivering accessory, and then utilize a second accessory, such as a dispensing or spray head, to dispense the mixture of the fluid and concentrate from the bottle.

SUMMARY

The present invention relates to an apparatus for dispensing a fluid that includes a body defining a chamber in which a fluid can be placed, the body including a neck portion having a collar with an outer surface, the outer surface of the neck portion including a first coupling mechanism formed thereon and a second coupling mechanism formed thereon, the second coupling mechanism being structurally different than the first coupling mechanism, and a spray head removably coupled to the body, wherein the spray head includes a coupling portion that engages with only one of the first coupling mechanism or the second coupling mechanism on the neck portion of the body to couple the spray head to the body, and one of the first coupling mechanism or the second coupling mechanism includes threads.

In an alternative embodiment, each of the first coupling mechanism and the second coupling mechanism includes one or more projections that extend outwardly from the collar. The first coupling mechanism includes a first quantity of projections and the second coupling mechanism includes a second quantity of projections, the second quantity of projections being different than the first quantity of projections. In another embodiment, the first quantity of projections is three and the second quantity of projections is one.

In another alternative embodiment, the first coupling mechanism includes multiple threads formed on the collar, and the second coupling mechanism includes at least one projection. The at least one projection is spaced apart from the multiple threads.

In yet another embodiment, the first coupling mechanism includes a first set of threads and a second set of threads, and the second set of threads is spaced apart from the first set of threads such that the first set of threads and the second set of threads are discontinuous from each other. The first set of threads is on an opposite side of the collar from the second set of threads. The first set of threads has a first end and a second end, the second set of threads has a third end and a fourth end, the first end is spaced apart from the fourth end, and the second end is spaced apart from the third end. A first gap is formed between the first end of the first set of threads and the fourth end of the second set of threads, a second gap is formed between second end of the first set of threads and the third end of the second set of threads, and the second coupling mechanism is located in one of the first gap or the second gap.

In another embodiment, an apparatus for dispensing a fluid includes a body defining a chamber in which a fluid can be placed, the body including a neck portion having a collar with an outer surface, the outer surface of the neck portion including a first coupling mechanism formed thereon and a second coupling mechanism formed thereon, the first coupling mechanism including a set of threads, the second coupling mechanism including a plurality of projections, and a spray head removably coupled to the body, wherein the spray head includes a coupling portion that engages with one of the set of threads or the plurality of projections to couple the spray head to the body so that the spray head can dispense the fluid from the body.

In one embodiment, the set of threads is a first set of threads, the first coupling mechanism includes a second set of threads, and the second set of threads is discontinuous from and spaced apart from the first set of threads. The second coupling mechanism is spaced apart from and located between the first set of threads and the second set of threads. The first set of threads and the second set of threads are on opposite sides of the collar from each other. The plurality of projections is a first plurality of projections, the second coupling mechanism includes a second plurality of projections separate from the first plurality of projections, and a spray head engaging the first plurality of projections also engages the second plurality of projections. The first plurality of projections is located between the first set of threads and the second set of threads on a first side of the collar, and the second plurality of projections is located between the first set of threads and the second set of threads on a second side of the collar opposite the first side of the collar.

In another embodiment, an apparatus for dispensing a fluid includes a body including a neck portion, the neck portion having a set of threads formed thereon and a set of projections formed thereon, the set of projections being spaced apart from and separate from the set of threads, and a dispensing head engageable with the neck portion of the body, the dispensing head including a coupling portion that engages with only one of the set of threads or the set of projections to couple the dispensing head to the body so that fluid can be dispensed from the body.

In one embodiment, the set of threads is a first set of threads and the set of projections is a first set of projections, the neck portion has a second set of threads formed thereon spaced apart from the first set of threads, and the neck portion has a second set of projections formed thereon spaced apart from the second set of threads. Each of the first set of projections and the second set of projections is located between the first set of threads and the second set of threads. The first set of projections is on an opposite side of the neck portion from the second set of projections, and the first set of threads is on an opposite side of the neck portion from the second set of threads.

DETAILED DESCRIPTION

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention relates to an accessory that can be used to dispense a fluid. In one embodiment, the accessory includes a container, such as a bottle, that has an inner chamber or receptacle in which a fluid can be located. The fluid in the bottle can be a water or a solution. To dispense the fluid in the bottle, a user can couple a dispensing accessory to the bottle. The dispensing accessory can be manipulated by a user to dispense the fluid, such as by spraying. Depending on the desired distribution of the fluid, a user may desire to change the particular dispensing accessory that is coupled to the bottle so that the particular desired spray distribution can be achieved. Different dispensing accessories may have different coupling mechanisms that are used to couple or mount the dispensing accessory to the container. Thus, the container needs to have at least two different coupling mechanisms that utilize different structures to facilitate the mounting of different dispensing accessories to the bottle.

In addition, in one embodiment, the container has a fluid, such as water, therein to which a concentrate needs to be added to form a solution. For example, a cleaning concentrate can be added to a container filled with water, thereby forming a cleaning solution. One way to add the concentrate to container is via a delivery accessory. The delivery accessory has a coupling mechanism that is used to mount or couple the delivery accessory to the container. In one embodiment, the coupling mechanism of the delivery accessory has a different structure than the coupling mechanism of a dispensing accessory that is subsequently coupled to the container to dispense the solution.

In one or more embodiments, the container is a bottle to which a dispensing accessory, such as a spray head is coupled. Some bottles with dispensing or delivery accessories as discussed above are described in U.S. Pat. Nos. 8,297,479; 8,408,429; 8,408,430; 8,453,950; 8,800,822; 8,870,033; 8,881,953; 9,751,667; 9,827,581; 9,878,834; 11,014,107; and 11,198,546, the disclosures of each of which are incorporated herein by reference in their entirety.

Figure 1:
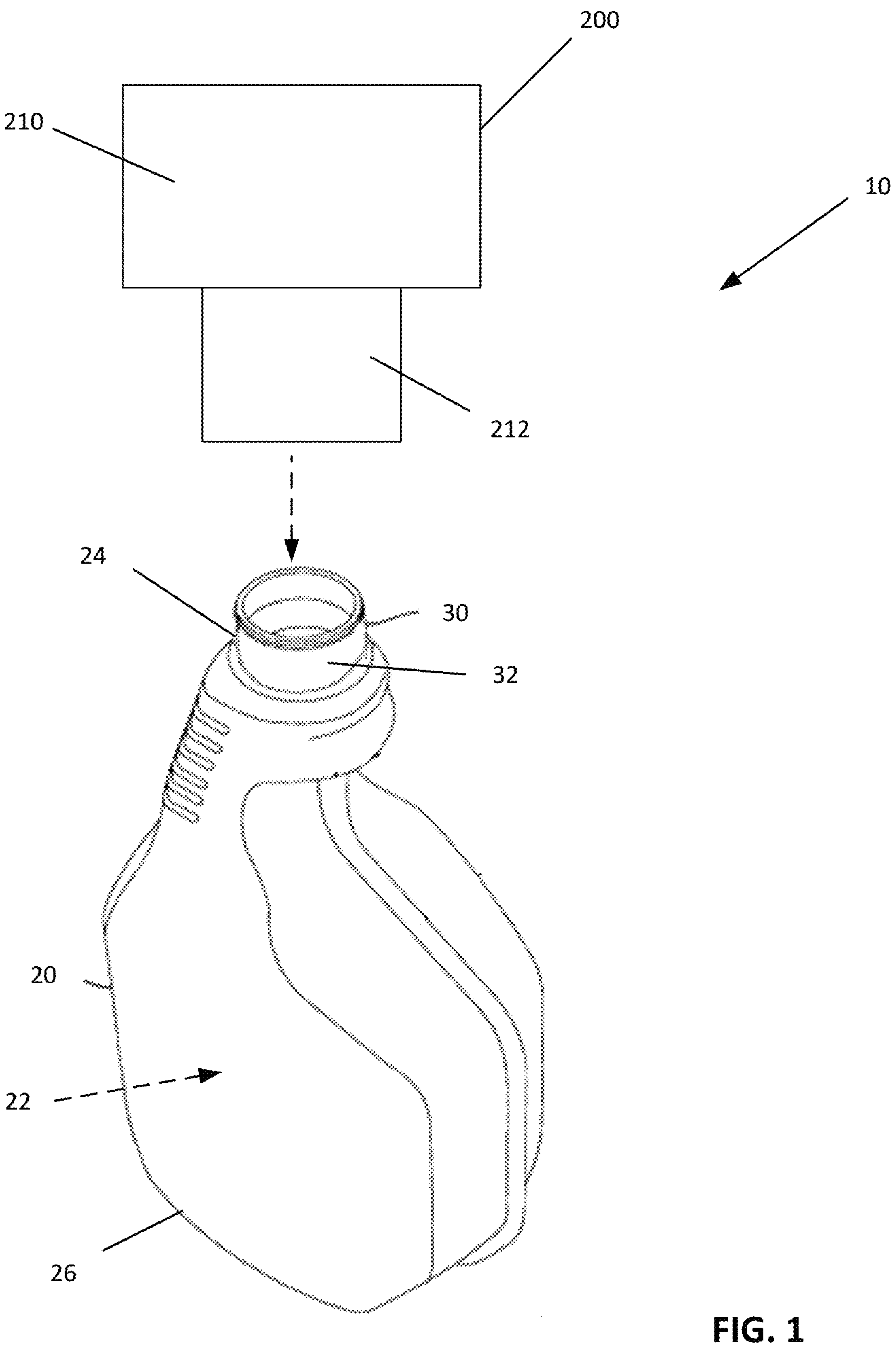
FIG. 1 is a perspective schematic view of an apparatus according to an embodiment of the invention.

Referring now to FIG. 1, an apparatus 10 according to an embodiment of the invention is shown. Different portions of the apparatus 10 are illustrated in either a schematic form and as an exemplary structure. In this embodiment, the apparatus 10 includes a container or bottle 20 that has a body defining an internal cavity or receptacle 22. The bottle 20 is referred to alternatively herein as a body. In various embodiments, the size and shape of the bottle 20 and the cavity 22 can vary.

The container 20 includes an upper end 24 and a lower end 26 opposite the upper end 24. Proximate the upper end 24 is a neck portion 30 that includes a collar 32 that extends upwardly. While the collar 32 illustrated in FIG. 1 is not shown with any coupling mechanism formed thereon, the various details of the coupling mechanisms according to the invention are illustrated in the different views of the collar 32 shown in FIGS. 2-7.

In one embodiment, the apparatus 10 includes a coupleable accessory 200 that has a body 210 and a coupling mechanism 212. The coupling mechanism 212 is configured to engage with the collar 32 of the container 20 to mount the coupleable accessory 200 to the container 20. In one embodiment, the coupleable accessory 200 is a dispensing accessory, such as a dispensing or fluid spray head, which can be coupled to the container 200. In another embodiment, the coupleable accessory 200 is a delivery accessory that can deliver a fluid or a concentrate to the cavity 22 of the container 20 which that fluid or concentrate is placed into the fluid in the cavity 22 and subsequently mixed.

The coupling mechanism 212 includes a structure that cooperates with a coupling mechanism on the collar 32. In one embodiment, the coupling mechanism 212 is a skirt or annular member that depends downwardly on the body 210. The annular member is sized to receive at least a portion of the collar 32. The annular member may include one or more notches or grooves or one or more projections or threads that engage cooperating structures on the collar 32.

Figure 2:
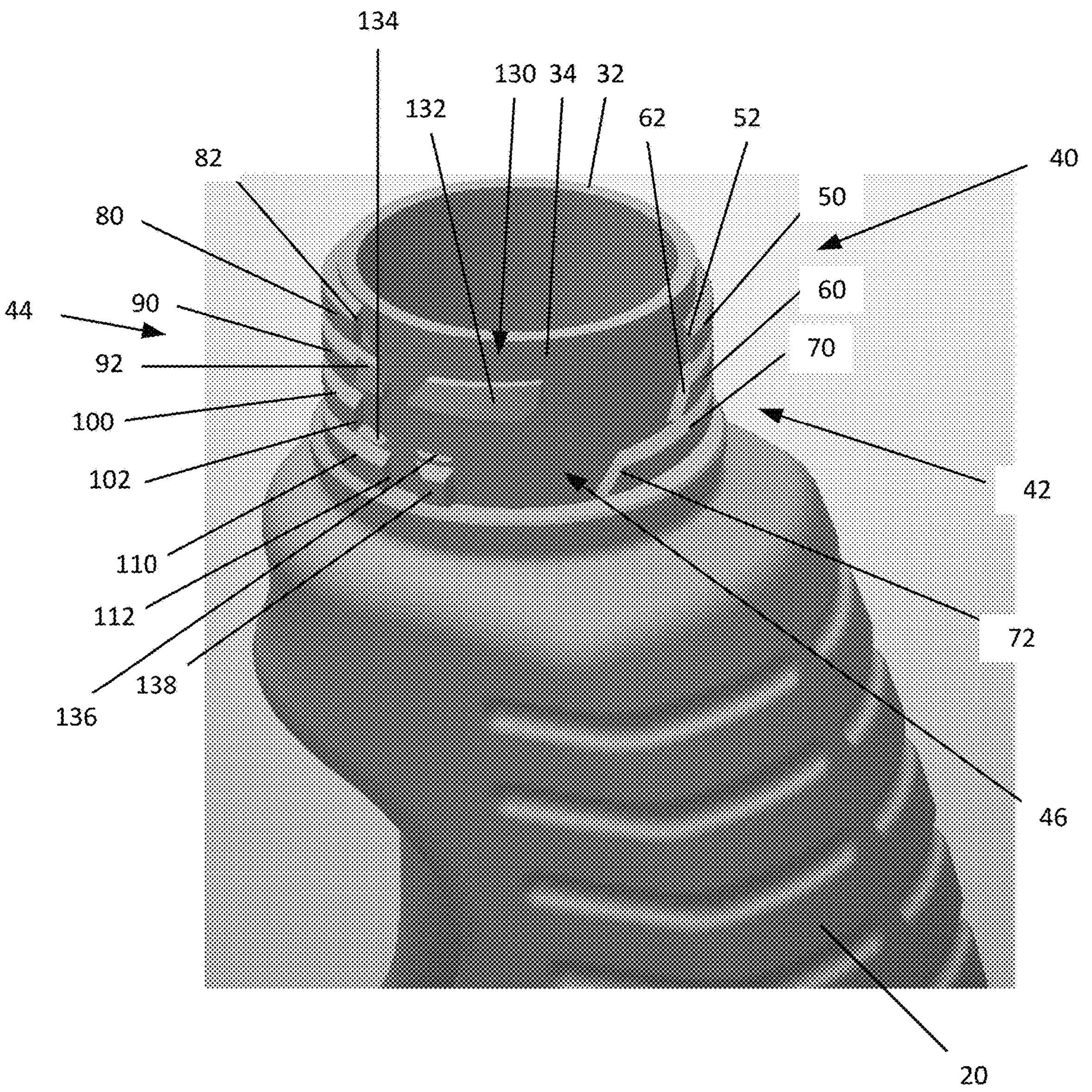
FIG. 2 is a rear perspective view of a portion of the container of the apparatus in FIG. 1.

Referring to FIG. 2, a rear perspective view of a portion of the container 20 is shown. In this embodiment, the container 20 includes a collar 32 that is cylindrical and that has an outer surface 34 extending therearound. The container 20 includes a first coupling mechanism 40 located on the collar. In one embodiment, the first coupling mechanism 40 is located on the outer surface 34 of the collar 32.

As shown, the first coupling mechanism 40 includes a first set of threads 42, which in this embodiment, includes several threads. The first set of threads 42 includes threads 50, 60, and 70 that generally have the same pitch as each other. Threads 50, 60, and 70 are not continuous and only extend around a portion of the perimeter of the collar 32. In FIG. 2, ends 52, 62, and 72 of threads 50, 60, and 70, respectively, are illustrated. While in this embodiment, the first set of threads 42 includes three threads, in different embodiments, the quantity of threads in the first set of threads 42 can vary.

In this embodiment, the first coupling mechanism 40 includes a second set of threads 44. The second set of threads 44 is spaced apart from the first set of threads 42. In particular, the second set of threads 44 and the first set of threads 42 are on opposite sides of the collar 32 from each other. The second set of threads 44 includes threads 80, 90, 100, and 110 that generally have the same pitch as each other. Like the threads 50, 60, and 70 in first set 42, threads 80, 90, 100, and 110 extend only around a portion of the perimeter of the collar 32. As a result, there are two gaps or spaces formed between ends of the first set of threads 42 and the second set of threads 44. In FIG. 2, ends 82, 92, 102, and 112 of threads 80, 90, 100, and 110, respectively, are illustrated. Between the thread ends 52, 62, and 72 and the thread ends 82, 92, 102, and 112 is a gap or space 46.

Threads 80, 90, 100, 110 are aligned with, but not continuous with, threads 50, 60, and 70. Because the threads 50, 60, 70, 80, 90, 100, and 110 are generally aligned, a coupleable accessory that has its own threaded coupling mechanism can engage with the collar 32 via the respective sets of threads.

Located in the gap or space 46 is part of a second coupling mechanism 120 on the container 20. The second coupling mechanism 120 is positioned on the outer surface 34 of the collar 32 as well. In this embodiment, the second coupling mechanism 120 has a first set of projections 130 that includes projections 132, 134, 136, and 138. The projections can be referred to alternatively as or bayonets. The first set of projections 130 are used to mount a different coupleable accessory to the container 20 than an accessory that uses the first thread set 42 and the second thread set 44.

Referring to FIG. 2, the interactive design between the second thread set 44 and the first projection set 130 is illustrated. End 92 of thread 90 is shown with a reduced raised thickness proximate the end. The edge of the reduced thickness of thread 90 is aligned vertically with the ends 82 and 102 of threads 80 and 100. This alignment allows a coupling mechanism on a separate accessory that is mounted to the collar 32 clearance to engage the projections 132, 134, 136, and 138 without interference with the threads 80, 90, 100, and 110. In addition, each of projection 134 and projection 136 is a narrow projection that has a bottom surface aligned with the bottom surface of the adjacent but spaced apart thread 100. This bottom surface alignment allows the threads of a coupleable accessory to engage the space between threads 100 and 110 without interference by projection 134 or projection 136.

Figure 3:
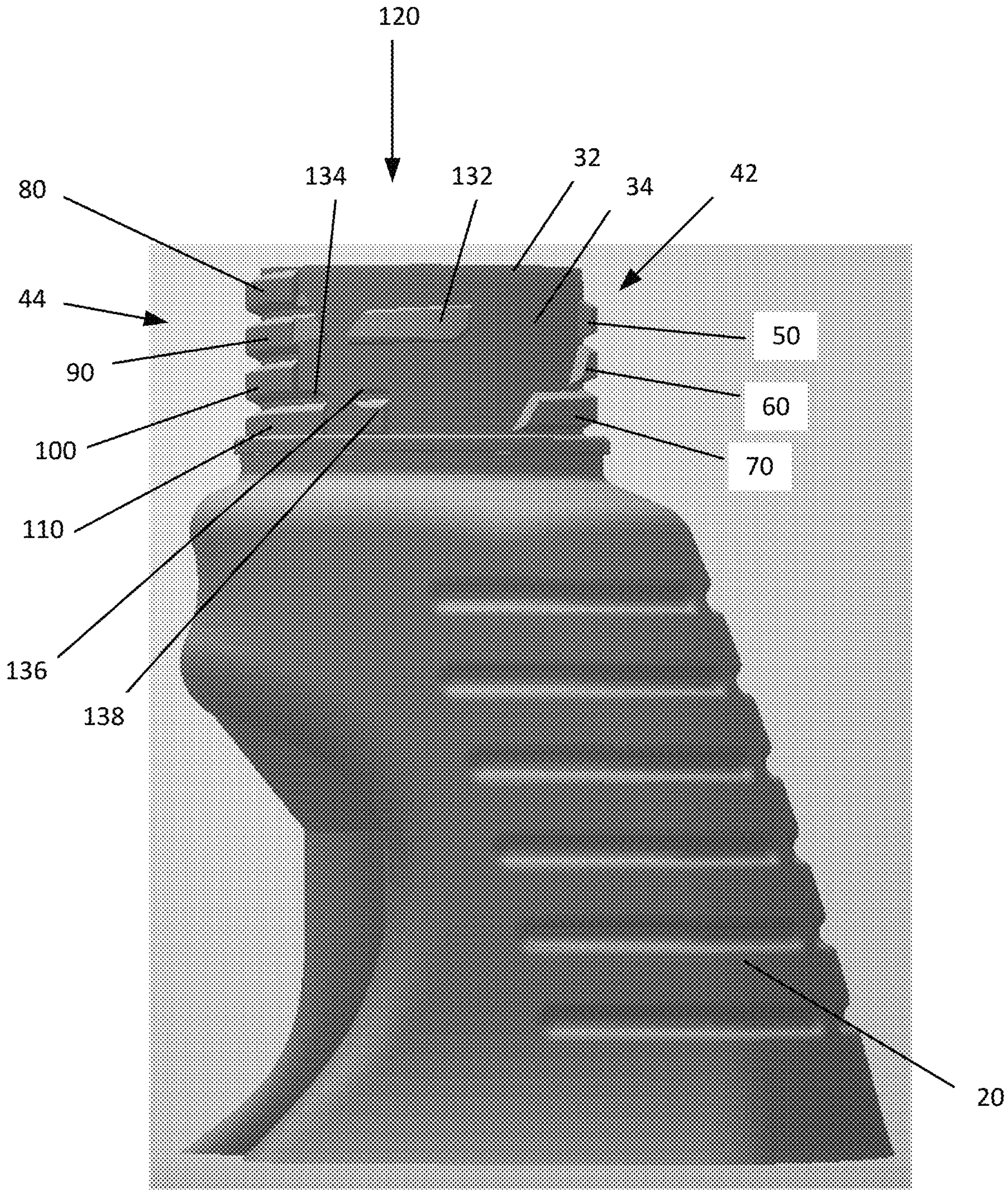
FIG. 3 is a side view of a portion of the container of the apparatus in FIG. 1.

Turning to FIG. 3, a side view of a portion of the container 20 is illustrated. Threads 50, 60, and 70 are on an opposite side of the collar 32 from threads 80, 90, 100, and 110. In addition, the spaced apart projections 132, 134, 136, and 138 of the second coupling mechanism 120 are shown. The alignment of the bottom surfaces of projections 134 and 136 with the bottom surface of thread 100 and the alignment of the end surfaces of threads 80, 90, and 100 are also shown.

Figure 4:
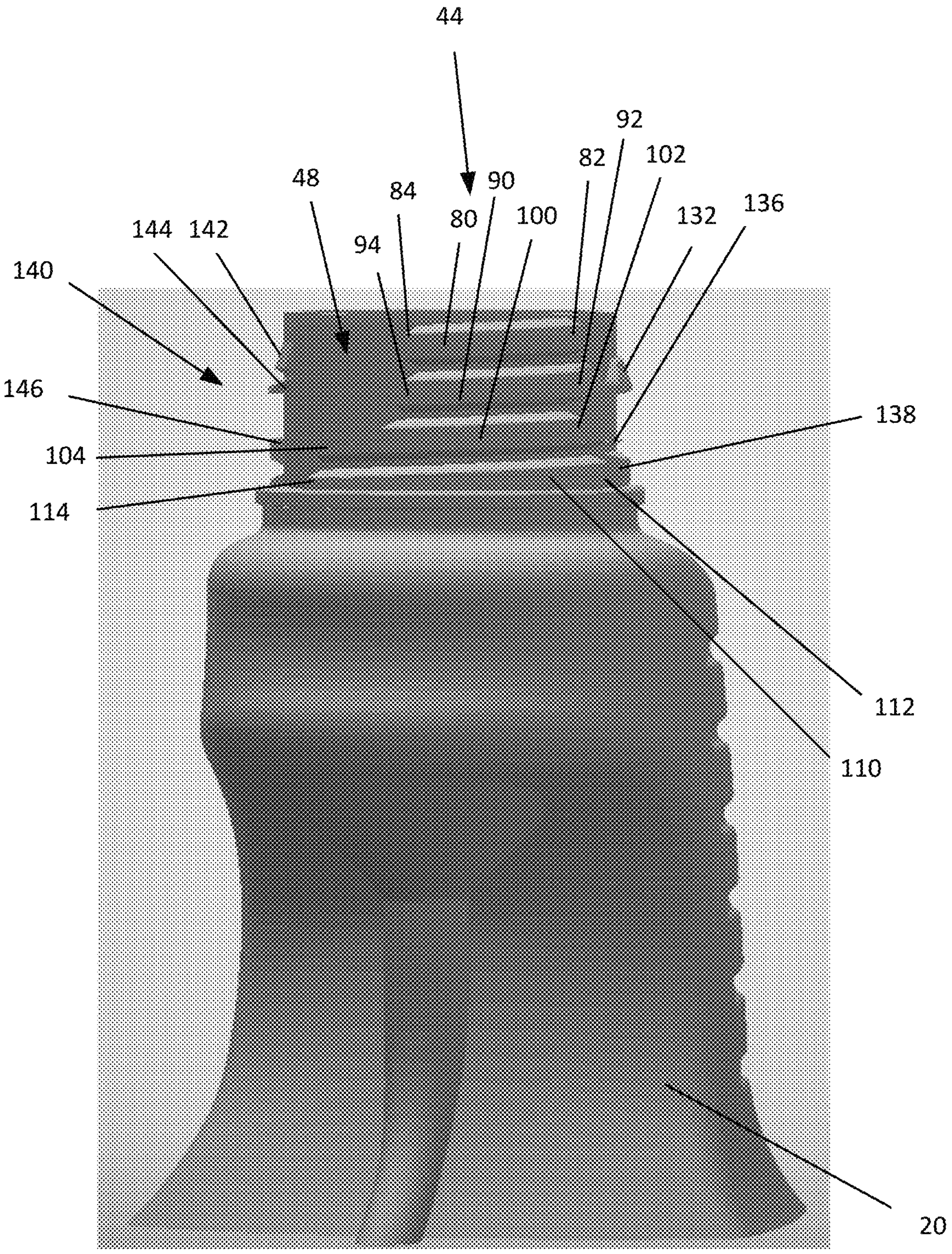
FIG. 4 is a front view of a portion of the container of the apparatus in FIG. 1.

Turning to FIG. 4, a front view of a portion of the container 20 is illustrated. In this view, the container 20 has been rotated 90 degrees about a vertical axis relative to its position illustrated in FIG. 3. Accordingly, the full lengths of the threads 80, 90, 100, and 110 are visible. Thread 80 extends between its ends 82 and 84 and is the shortest thread of the second thread set 44. Thread 90 extends between its ends 92 and 94 and is slightly longer than thread 80. Thread 100 extends between its ends 102 and 104 and is even longer than thread 90. Finally, thread 110 extends between its ends 112 and 114 and is much longer than the other threads 80, 90, and 100. In addition, a portion of thread 100 proximate end 104 has a reduced thickness such that it extends outwardly less than the remainder of thread 100. This reduced thickness facilitates the mounting of an accessory that engages the second set of projections 140, which are described below. Proximate ends 84, 94, 104, and 114 is a gap or space 48.

In this embodiment, a second set of projections 140 of second coupling mechanism 120 is located on the outer surface 34 of collar 32 and are in the gap or space 48. A few of the second projection set 140 are visible in FIG. 4. In particular, projections 142, 144, and 146 are shown.

Figure 5:
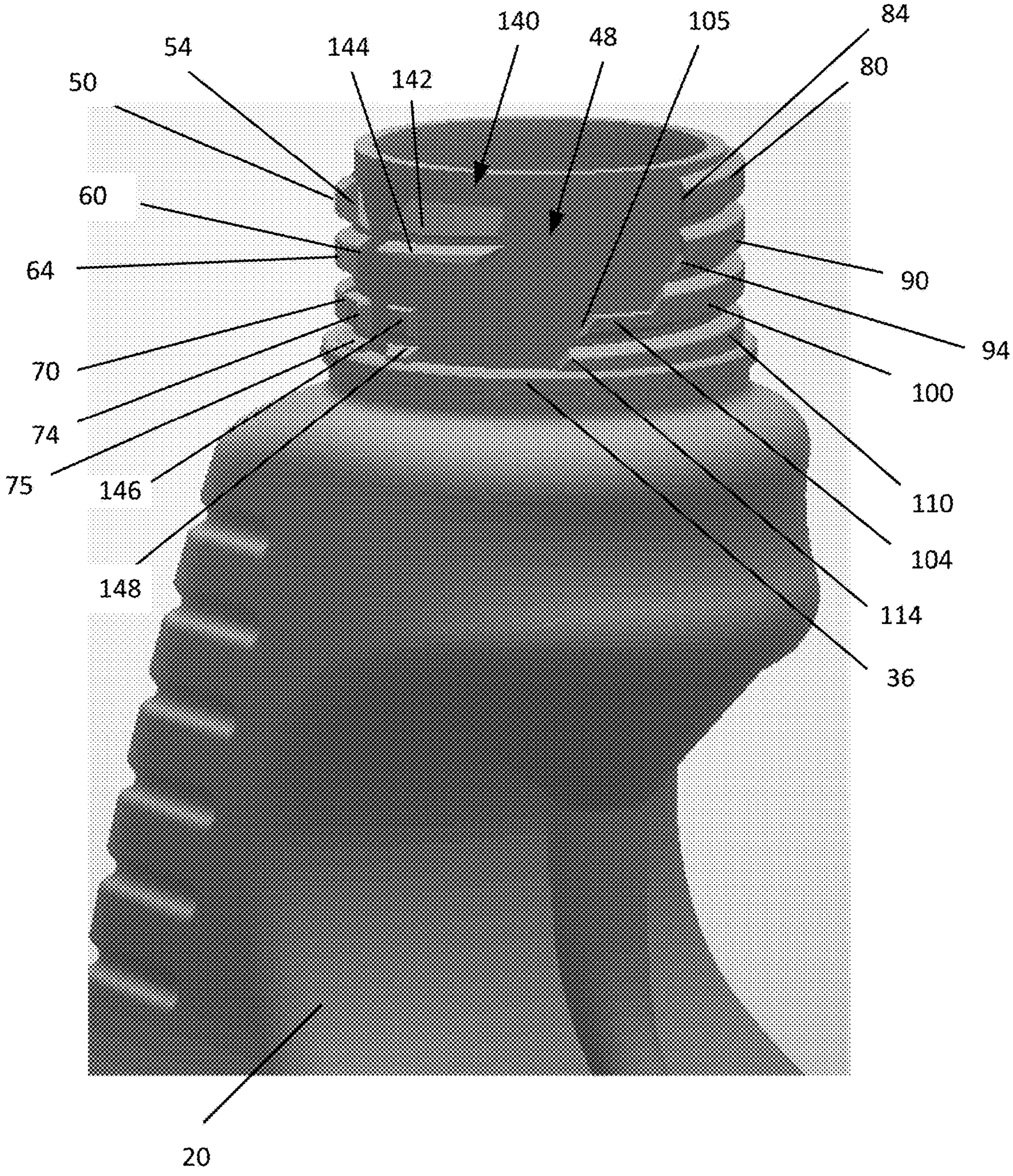
FIG. 5 is a front perspective view of a portion of the container of the apparatus in FIG. 1.

Turning to FIG. 5, a front perspective view of a portion of the container 20 is illustrated. In this view, the container 20 has been rotated about a vertical axis so that a different portion of the outer surface 34 of the collar 32 is shown. The different surfaces of thread ends 84, 94, 104, and 114 are shown. The surface of thread end 84 is generally flat. The surface of thread end 94 is formed of two angled surfaces. Thread end 104 includes a first angled surface that is aligned with the lower angled surface of thread end 94. In addition, thread end 104 includes a reduced thickness portion that is also thinner in height. That reduced thickness portion has an end surface that is slightly angled as well. Thread end 114 has a continuous thickness and terminates in an end surface that is aligned with the distal end surface 105 of thread 100. The combination of aligned surfaces and reduced thickness portions of threads 80, 90, 100, and 110 eliminates the interference of those threads with an accessory that is mounted to collar 32 and that engages with the second set of projections 140, which are described below.

The various ends 54, 64, and 74 of threads 50, 60, and 70, respectively, are shown in FIG. 5. Also, due to the pitch of the threads, the first set of threads 42 also includes a short thread 75 that is located slightly above a flange 36 that is formed on the collar 32.

As described above, one embodiment of a coupleable accessory engages the first coupling mechanism 40 but not the second coupling mechanism 120. When the accessory engages the first coupling mechanism 40, the accessory's coupling portion has threads that engage with threads 50, 60, and 70 and threads 80, 90, 100, and 110. When the respective sets of threads on the accessory and the collar are engaged, the accessory is rotated and the various sets of threads couple the accessory to the container 20.

In FIG. 5, all of the second set of projections 140 are shown, including projections 142, 144, 146, and 148 that are located in the gap or space 48. Projection 142 has an angled surface and functions as a catch that engages a corresponding structure on the accessory. Projection 144 is a thin, elongate projection that has an upper surface aligned with the upper surface of thread 60. However, the thickness of projection 144 is less than that of thread 60. Projections 146 and 148 are shorter in length, but each is aligned with a corresponding one of threads 70 and 75. The alignment of projections 146 and 148 with threads 70 and 75 facilitates the engagement of a first accessory's threads with the container threads while providing access to the second projection set 140 for a different accessory. Thus, none of the sets of projections 130 and 140 interferes with the engagement of the threads.

Figure 6:
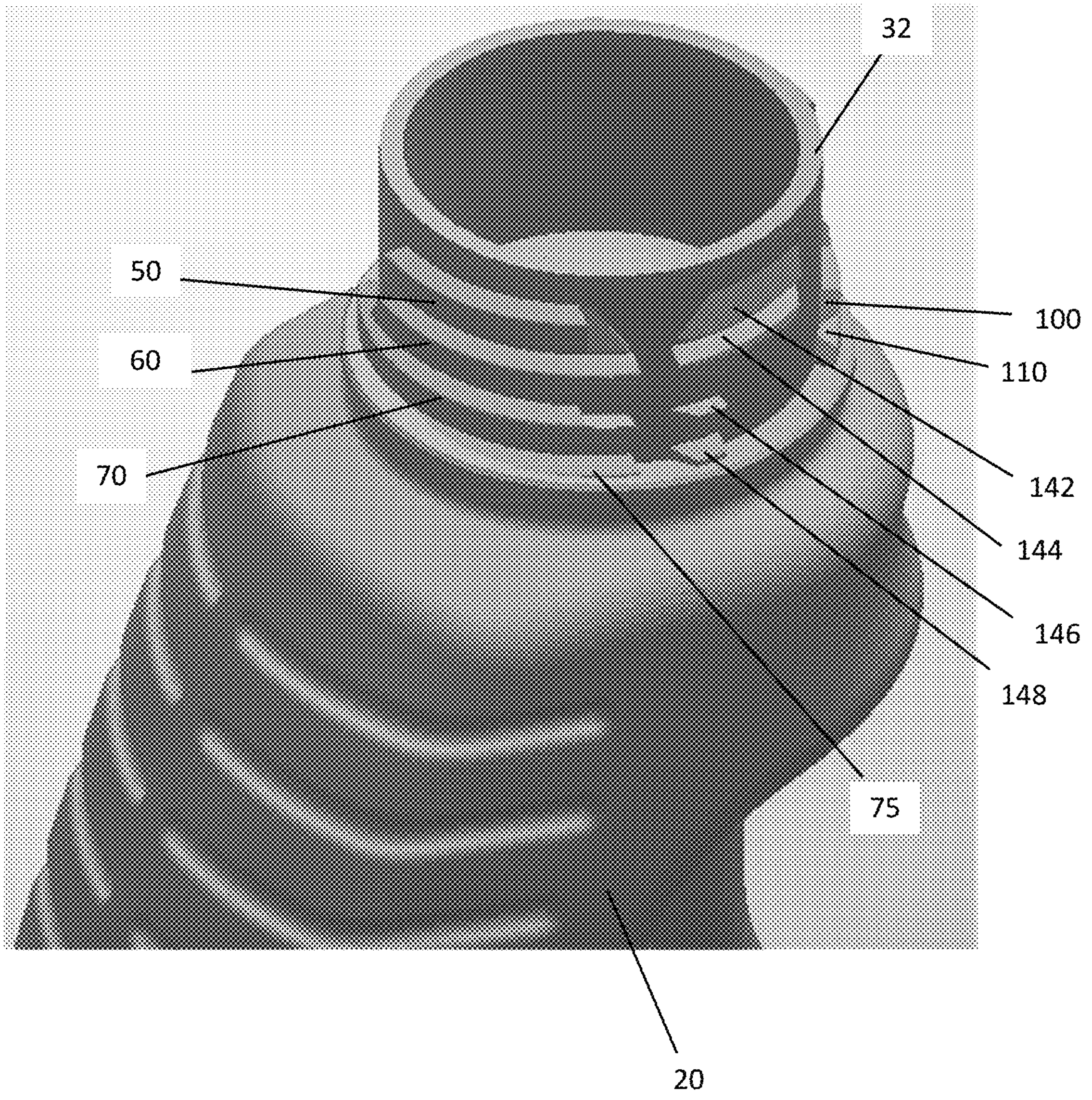
FIG. 6 is another rear perspective view of a portion of the container of the apparatus in FIG. 1.

Referring to FIG. 6, another rear perspective view of the container 20 is shown. In this view, the relative spacing and positioning of threads 50, 60, 70, 100, and 110 and projections 142, 144, 146, and 148 are illustrated. As mentioned above, each of projections 146 and 148 is spaced apart from one of threads 70 and 75, but tailored or sized to have the same pitch as the proximate one of threads 70 and 75.

As discussed above, one embodiment of a coupleable accessory engages the second coupling mechanism 120 but not the first coupling mechanism 40. When this accessory embodiment engages the second coupling mechanism 120, it engages with the first set of projections 130 and the second set of projections 140, thereby securing the accessory to the container 20. This particular accessory is placed on the collar 32 and pressed downwardly so that the coupling portion of the accessory engages and is mounted on the collar of the container 20.

Figure 7:
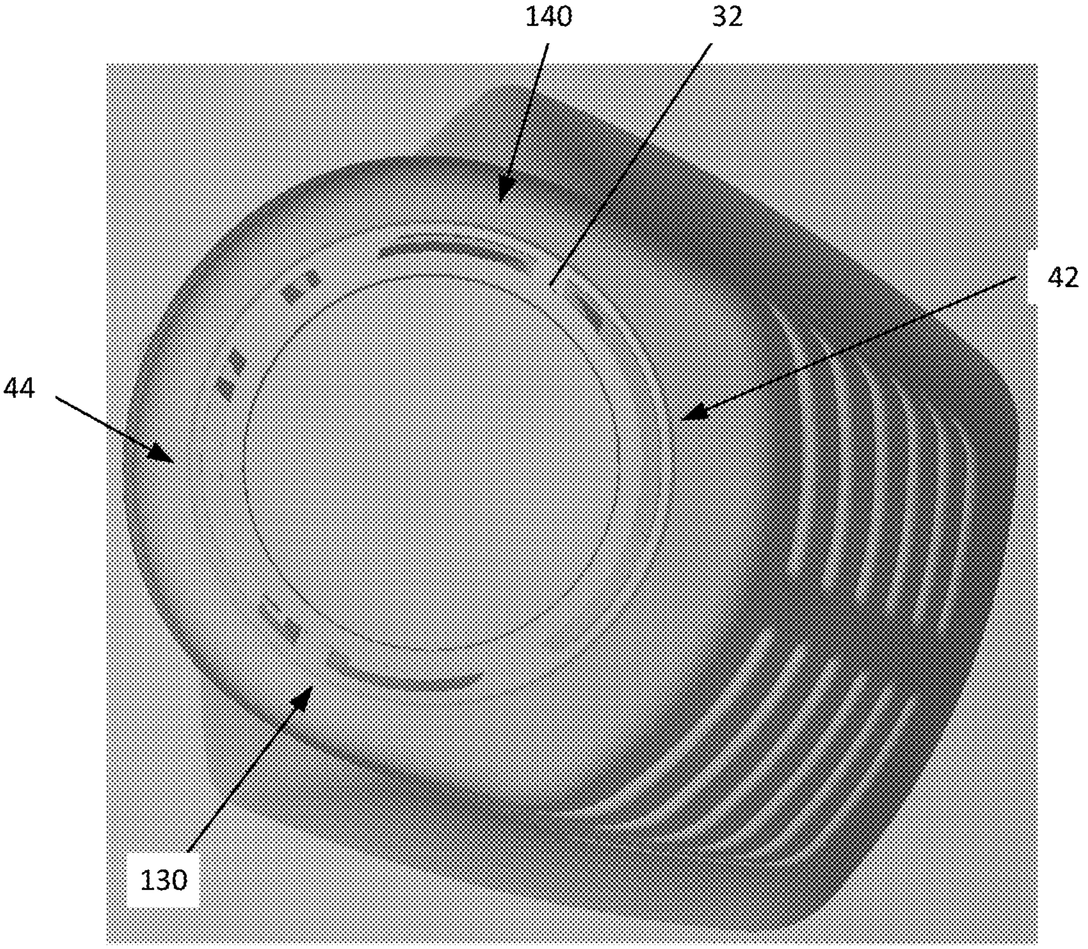
FIG. 7 is a top view of a portion of the container of the apparatus in FIG. 1.

Referring to FIG. 7, a top view of a portion of the container 20 is illustrated. The first set of threads 42 is on an opposite side of the collar 32 from the second set of threads 44. Similarly, the first set of projections 130 is on an opposite side of the collar 32 from the second set of projections 140. The thread sets 42 and 44 are configured so that they do not interfere with a coupleable accessory that engages the projection sets 130 and 140. Likewise, the projection sets 130 and 140 are configured so that they do not interfere with a coupleable accessory that engages the thread sets 42 and 44.

Figure 8:
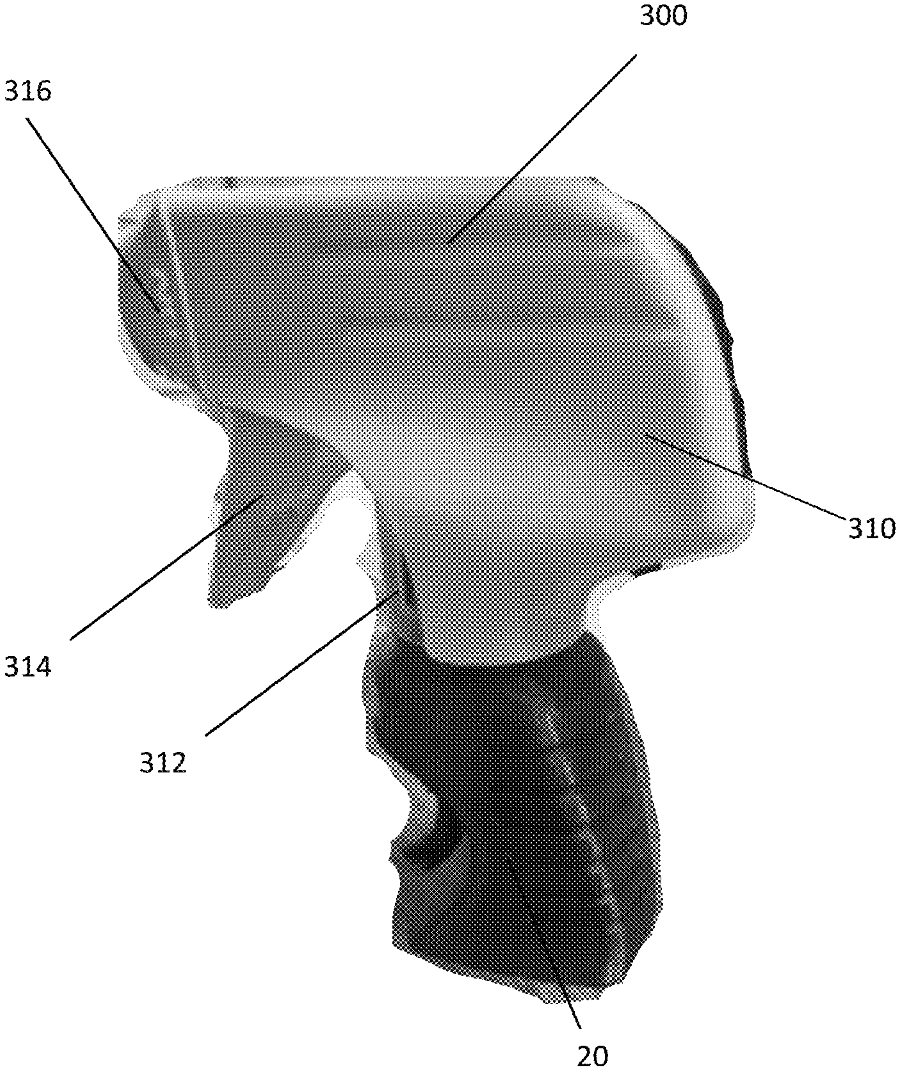
FIG. 8 is a side view of a portion of a container and a dispensing accessory according to an embodiment of the invention.

Referring to FIG. 8, a side view of a portion of a container and a dispensing accessory according to an embodiment of the invention is illustrated. The coupleable accessory 300 is a dispensing accessory that includes a body 310 with a coupling portion 312, such as a skirt or annular member, which is coupled to a container 20, only a portion of which is illustrated in FIG. 8. Coupled to the body 310 is a trigger 314 that can be pulled or activated by a user so that a fluid in the container 20 is sprayed from the accessory 300 through the outlet port 316.

Figure 9:
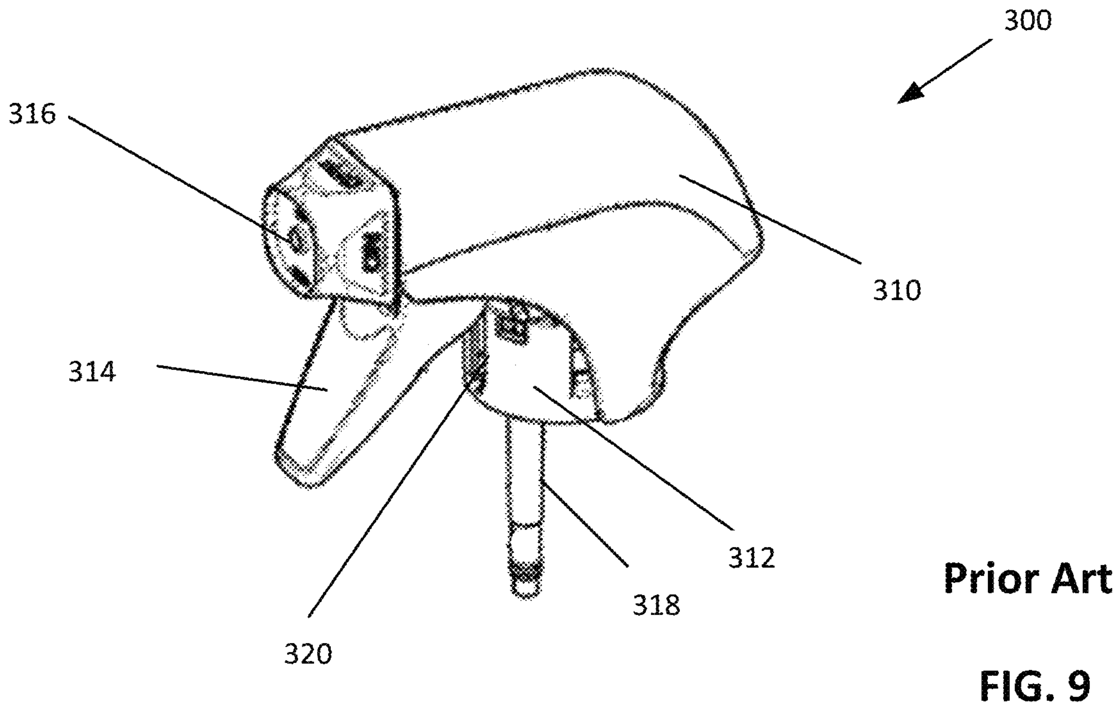
Prior Art FIG. 9
FIG. 9 is a perspective view of a conventional dispensing accessory that can be used with a container according to an embodiment of the invention.

Referring to FIG. 9, a perspective view of a conventional dispensing accessory that can be used with the container 20 is illustrated. The accessory 300 is the same as that shown in FIG. 8 and described above. In this embodiment, the dispensing accessory 300 includes a body 310 with a coupling portion or skirt 312 that has one or more notches or openings 320 that can engage with one or more of the projections in projection sets 130 and 140. A guide tube 318 depends downwardly on the body 310 and engages with a corresponding port or opening inside of the container 20. The accessory 300 also includes a trigger 314 that can be actuated to spray the fluid from the container via outlet port 316.

Figure 10:
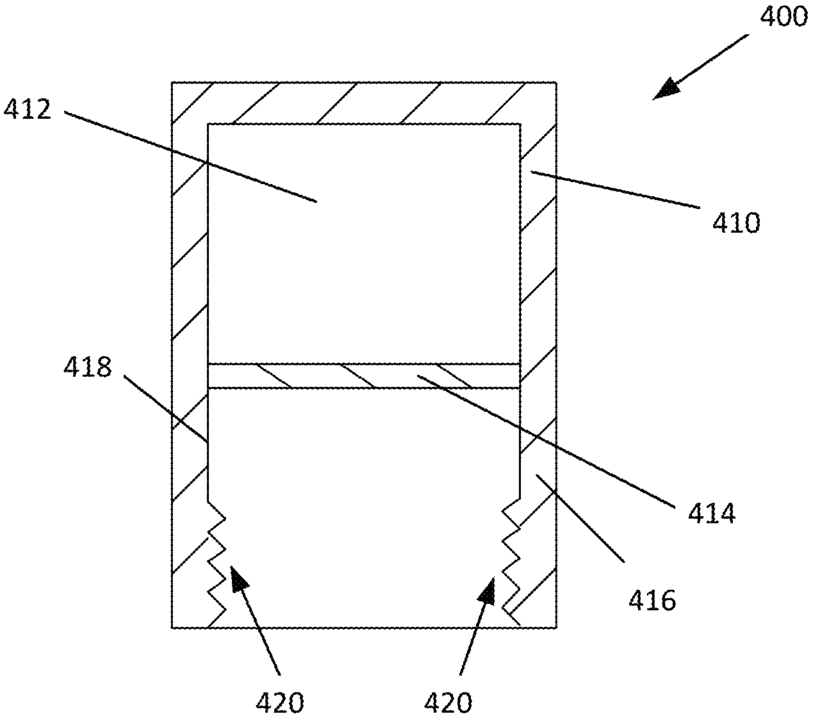
FIG. 10 is a cross-sectional side view of a schematic a delivery accessory that can be used with a container according to an embodiment of the invention.

FIG. 10 is a cross-sectional side view of a schematic of another coupleable accessory that can be used with container 20 according to an embodiment of the invention. The coupleable accessory 400 is a delivery accessory that is used to provide a material, such as a fluid or a concentrate, to the cavity 22 of the container 20. The delivery accessory 400 includes a body 410 that defines a cavity or chamber 412 in which a material, such as a liquid or a solid like a powder, is located. A barrier 414 is located within the body 410 and defines the lower side of the cavity 412. When the barrier 414 is broken, the contents of the cavity 412 can exit the body 410 and enter into a container 20. The lower portion of the body 410 includes a coupling portion 416 with an inner surface 418 that has several threads 420 formed thereon. The threads 420 can engage with threads 50, 60, 70, 80, 90, 100, and 110 to couple accessory 400 to the container 20. In one embodiment, the threads 420 can be continuous around the perimeter of inner surface 418. In another embodiment, the threads 420 can be discontinuous on the inner surface 418, but each set of discontinuous threads 420 can be aligned to facilitate the mounting of accessory 400 to the container 20.

Figure 11:
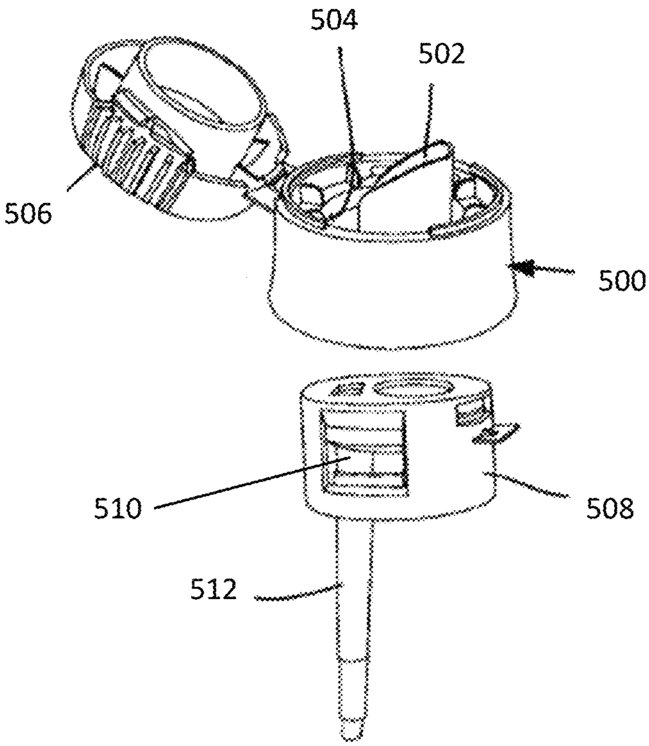
Prior Art FIG. 11
FIG. 11 is a perspective view of another conventional dispensing accessory that can be used with a container according to an embodiment of the invention.

Referring to FIG. 11, a perspective view of another conventional dispensing accessory that can be used with container 20 according to an embodiment of the invention is illustrated. As shown, the accessory 500 includes a body that is a pour through cap through which fluid may flow. The body includes a pour spout 502 and an air vent 504. A closure member 506 is pivotally coupled to the body. The accessory 500 includes a coupling mechanism or skirt 508 with a coupling mechanism 510 that includes one or more openings. In addition, the accessory 500 includes a guide tube or supply line 512 that engages with the container 20 as well.

Figure 12:
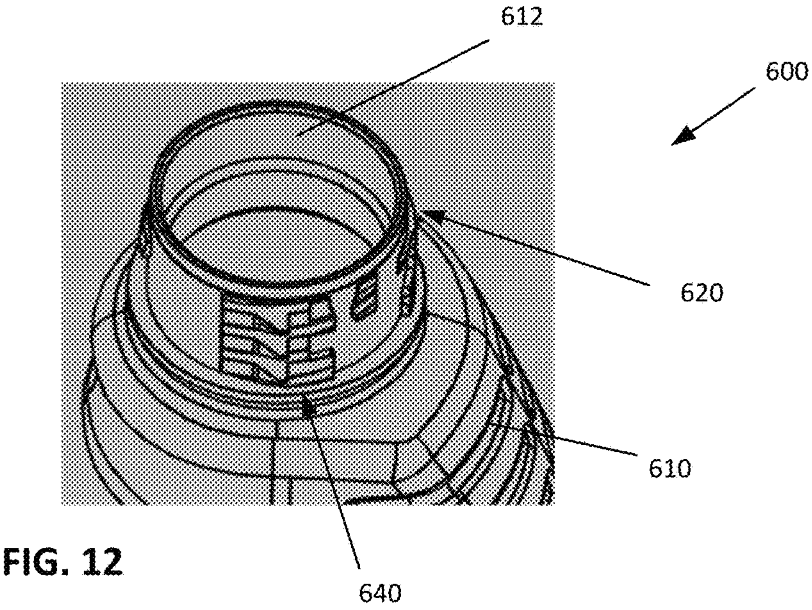
FIGS. 12-14 are different perspective views of an alternative embodiment of an apparatus according to the present invention.
Figure 13:
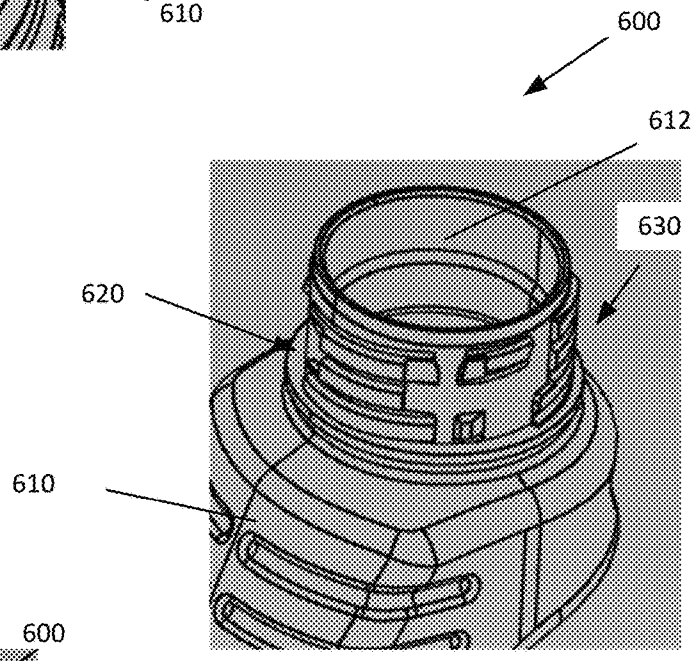
Figure 14:
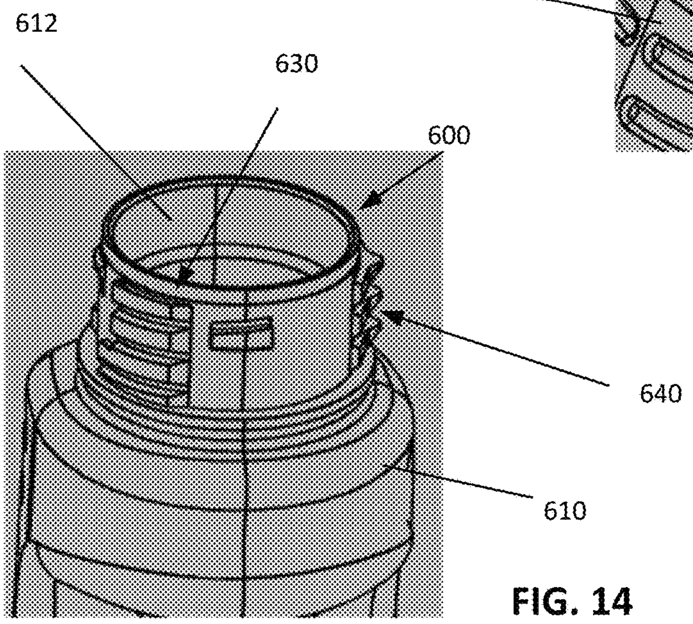

Referring to FIGS. 12-14, different perspective views of an alternative embodiment of an apparatus according to the present invention are illustrated. In this embodiment, the coupling mechanisms of the container 610 of apparatus 600 are slightly different than those described above relative to container 20. In particular, container 610 includes a "double lead" or "double thread" coupling mechanism located on its neck 612.

A double thread connection provides multiple start threads, which facilitates quicker threading and, as a result, faster assembly and disassembly of components. In addition, a double thread allows the mating of threads in multiple orientations. A double thread has a lead (the linear screw travel for one revolution) that is twice its measured pitch.

Referring to FIGS. 12-14, the container 610 includes a first threaded coupling mechanism that utilizes two sets of threads 620 and 630 to mount a threaded component to the neck 612 of the container 610. In addition, the container 610 includes another or second threaded coupling mechanism that provides the double thread connection. As shown, a separate set of threads 640 are provided on the neck 612 that can be used as a different set of threads (separate from thread sets 620 and 630) to mount a coupleable accessory to container 610.

In different embodiments, one or more of the coupling mechanisms on the collar of the container or bottle can be integrally formed with the collar, or may be formed separately and coupled to the collar.

Like numbers refer to like elements throughout. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

The term "comprising" which is synonymous with "including," "containing," or "characterized by," is inclusive or open-ended and does not exclude additional, unrecited elements or method steps. The term "consisting essentially of" limits the scope of a claim to the specified materials or steps "and those that do not materially affect the basic and novel characteristic(s)" of the claimed invention. The term "consisting of" as used herein, excludes any element, step, or ingredient not specified in the claim.

All publications, patents and patent applications cited herein, whether supra or infra, are hereby incorporated by reference in their entirety to the same extent as if each individual publication, patent or patent application was specifically and individually indicated to be incorporated by reference.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for dispensing a fluid, the apparatus comprising:

a body defining a chamber in which a fluid can be placed, the body including a neck portion having a collar with an outer surface, the outer surface of the neck portion including a first coupling mechanism formed thereon and a second coupling mechanism formed thereon, the second coupling mechanism being structurally different than the first coupling mechanism, each of the first coupling mechanism and the second coupling mechanism including one or more projections that extend outwardly from the collar; and a spray head removably coupled to the body, wherein the spray head includes a coupling portion that engages with only one of the first coupling mechanism or the second coupling mechanism on the neck portion of the body to couple the spray head to the body, and one of the first coupling mechanism or the second coupling mechanism includes threads.

2. The apparatus of claim 1, wherein the first coupling mechanism includes a first quantity of projections and the second coupling mechanism includes a second quantity of projections, the second quantity of projections being different than the first quantity of projections.

3. The apparatus of claim 2, wherein the first quantity of projections is three and the second quantity of projections is one.

4. The apparatus of claim 1, wherein the first coupling mechanism includes multiple threads formed on the collar, and the second coupling mechanism includes at least one projection.

5. The apparatus of claim 4, wherein the at least one projection is spaced apart from the multiple threads.

6. The apparatus of claim 1, wherein the first coupling mechanism includes a first set of threads and a second set of threads, and the second set of threads is spaced apart from the first set of threads such that the first set of threads and the second set of threads are discontinuous from each other.

7. The apparatus of claim 6, wherein the first set of threads is on an opposite side of the collar from the second set of threads.

8. The apparatus of claim 6, wherein the first set of threads has a first end and a second end, the second set of threads has a third end and a fourth end, the first end is spaced apart from the fourth end, and the second end is spaced apart from the third end.

9. The apparatus of claim 8, wherein a first gap is formed between the first end of the first set of threads and the fourth end of the second set of threads, a second gap is formed between second end of the first set of threads and the third end of the second set of threads, and the second coupling mechanism is located in one of the first gap or the second gap.

10. An apparatus for dispensing a fluid, the apparatus comprising:

a body defining a chamber in which a fluid can be placed, the body including a neck portion having a collar with an outer surface, the outer surface of the neck portion including a first coupling mechanism formed thereon and a second coupling mechanism formed thereon, the first coupling mechanism including a first set of threads and a second set of threads, the second set of threads being discontinuous from and spaced apart from the first set of threads, the second coupling mechanism including a plurality of projections; and a spray head removably coupled to the body, wherein the spray head includes a coupling portion that engages with one of the first or second sets of threads or the plurality of projections to couple the spray head to the body so that the spray head can dispense the fluid from the body.

11. The apparatus of claim 10, wherein the second coupling mechanism is spaced apart from and located between the first set of threads and the second set of threads.

12. The apparatus of claim 10, wherein the first set of threads and the second set of threads are on opposite sides of the collar from each other.

13. The apparatus of claim 10, wherein the plurality of projections is a first plurality of projections, the second coupling mechanism includes a second plurality of projections separate from the first plurality of projections, and a spray head engaging the first plurality of projections also engages the second plurality of projections.

14. The apparatus of claim 13, wherein the first plurality of projections is located between the first set of threads and the second set of threads on a first side of the collar, and the second plurality of projections is located between the first set of threads and the second set of threads on a second side of the collar opposite the first side of the collar.

15. An apparatus for dispensing a fluid, the apparatus comprising:

a body defining a chamber in which a fluid can be placed, the body including a neck portion having a collar with an outer surface, the outer surface of the neck portion including a first coupling mechanism formed thereon and a second coupling mechanism formed thereon, the second coupling mechanism being structurally different than the first coupling mechanism, the first coupling mechanism includes a first set of threads and a second set of threads, and the second set of threads is spaced apart from the first set of threads such that the first set of threads and the second set of threads are discontinuous from each other; and a spray head removably coupled to the body, wherein the spray head includes a coupling portion that engages with only one of the first coupling mechanism or the second coupling mechanism on the neck portion of the body to couple the spray head to the body, and one of the first coupling mechanism or the second coupling mechanism includes threads.

16. The apparatus of claim 15, wherein the first set of threads has a first end and a second end, the second set of threads has a third end and a fourth end, the first end is spaced apart from the fourth end, and the second end is spaced apart from the third end, and wherein a first gap is formed between the first end of the first set of threads and the fourth end of the second set of threads, a second gap is formed between second end of the first set of threads and the third end of the second set of threads, and the second coupling mechanism is located in one of the first gap or the second gap.

17. The apparatus of claim 15, wherein the neck portion having a set of projections formed thereon, the set of projections being spaced apart from and separate from the first set of threads and the second set of threads.

18. The apparatus of claim 17, wherein the set of projections is a first set of projections, and the neck portion has a second set of projections formed thereon spaced apart from the second set of threads.

19. The apparatus of claim 18, wherein each of the first set of projections and the second set of projections is located between the first set of threads and the second set of threads.

20. The apparatus of claim 18, wherein the first set of projections is on an opposite side of the neck portion from the second set of projections, and the first set of threads is on an opposite side of the neck portion from the second set of threads.

* * * * *